United States Patent [19]

Jezl

[11] 4,301,256
[45] Nov. 17, 1981

[54] CRYSTALLINE OLEFIN BLOCK POLYMERS AND THEIR PREPARATION

[75] Inventor: James L. Jezl, Swarthmore, Pa.

[73] Assignee: Standard Oil Company (Indiana), Chicago, Ill.

[21] Appl. No.: 559,481

[22] Filed: Mar. 18, 1975

Related U.S. Application Data

[60] Division of Ser. No. 728,039, May 9, 1968, Pat. No. 3,873,642, which is a continuation-in-part of Ser. No. 424,819, Jan. 11, 1965, abandoned, which is a continuation-in-part of Ser. No. 90,173, Feb. 20, 1961, abandoned, and Ser. No. 816,714, May 29, 1959, abandoned, said Ser. No. 90,173, is a continuation-in-part of Ser. No. 816,714, , abandoned.

[51] Int. Cl.$^3$ ............................................ C08F 297/08
[52] U.S. Cl. .................................... 525/247; 525/321; 525/323
[58] Field of Search ............... 260/878 B; 525/321, 525/323, 247

[56] References Cited

U.S. PATENT DOCUMENTS 3,318,976 5/1967 Short ........................... 260/878 B
3,970,719 7/1976 Edmonds ..................... 260/878
4,039,632 8/1977 Edmonds ..................... 525/323

Primary Examiner—Paul R. Michl
Attorney, Agent, or Firm—Stephen L. Hensley; William T. McClain; William H. Magidson

[57] ABSTRACT

Substantially crystalline block polymers comprising a homo-polymer block of an alpha-olefin having 2–8 carbon atoms and attached thereto a copolymer block of at least 2 alpha-olefins containing 2–2 carbon atoms, one of which may be the same or different from the alpha-olefin from which the homo-polymer block is prepared. Such block polymers are prepared in the presence of a stereospecific catalyst system by contacting the aforesaid alpha-olefin with said catalyst system to form the solid, substantially crystalline homo-polymer block, and then contacting the same catalyst system with the aforesaid mixture of said alpha-olefins. In an embodiment between about 55 and 95% of the polymerization time is expended in preparing the homo-polymer block. When preparing the copolymer block, one uses at least as much of the least reactive alpha-olefin, or more of the same, as one uses of the more reactive monomers.

5 Claims, No Drawings

CRYSTALLINE OLEFIN BLOCK POLYMERS AND THEIR PREPARATION

This is a division, of application Ser. No. 728,039, filed May 9, 1968 now 3,873,642 which is a continuation-in-part of application Ser. No. 90,173, filed Feb. 20, 1961 which in turn is a continuation-in-part of application Ser. No. 816,714, filed May 29, 1959, both of which applications are now abandoned. Application Ser. No. 728,039 is also a continuation-in-part of application Ser. No. 424,819, filed Jan. 11, 1965, which in turn is a continuation-in-part of the two aforesaid abandoned applications.

This invention relates to the preparation of substantially crystalline block polymers from alpha-olefins and to the resulting novel polymers wherein the molecules consist essentially of a single section of one alpha-olefin homo-polymer attached to a single section of an alpha-olefin interpolymer.

The preparation of homo-polymers and of copolymers from alpha-olefins has heretofore been described. For promoting the polymerization it is known to employ a catalyst system comprising solid particles of a metal subhalide, wherein the metal is one selected from the metals of Groups IVa, Va, and VIa of the Periodic Table, dispersed in an inert hydrocarbon reaction medium. An activator for the metal subhalide is also used. A particularly effective catalyst system for obtaining solid polymers of alpha-olefins comprises $TiCl_3$ in combination with an aluminum alkyl activator such as aluminum triethyl. In the polymerization step the alpha-olefin, or a mixture of alpha-olefins if copolymers are to be prepared, is contacted with a dispersion of the catalyst particles in an inert liquid hydrocarbon reaction medium under polymerizing conditions effective to produce high molecular weight polymers. Anhydrous and oxygen-free conditions are used in the polymerization step since the catalyst becomes deactivated through contact with water or oxygen.

Polymers having highly crystalline structure by X-ray analysis can thus be prepared from various alpha-olefins, for example, from propylene. The polymerization product generally contains some amount of amorphous or atactic polymers which are more soluble in hydrocarbon solvents than the crystalline polymers and, hence, can be separated therefrom, for example, by extraction with pentane at room temperature.

Polymers heretofore prepared by the foregoing procedure are useful in many applications, but are not suitable for use in certain other applications. Thus, such a polymer may exhibit certain properties which are desirable for a particular application but be deficient with respect to certain other properties. For example, polyethylene is valuable in applications where low brittle point is desirable, but it has a relatively low melting point which renders it unsuitable for certain applications where good clarity, high stiffness and tensile strength and resistance to boiling water are desired. Crystalline polypropylene, on the other hand, exhibits resistance to boiling water, high tensile strength and stiffness, good clarity and the like, but it has a brittle point which makes it unsuitable for certain low temperature applications. Also, polypropylene generally has an impact strength which rules out its use for various applications. Random copolymers of ethylene and propylene do not combine the best properties of each homo-polymer; in fact, the presence of a material amount of another alpha-olefin during the polymerization substantially destroys the crystallinity otherwise observed in polypropylene.

Belgian Patent No. 553,720 discloses the preparation of block polymers by means of a two-stage process and aluminum alkyl-titanium tetrachloride catalysts. However, it is necessary that a solution of the first homopolymer block in an inert solvent be formed as a consequence of the first stage of the block polymerization process, and that this solution formed in situ be mixed with a second monomer and polymerized to complete the block polymer, whereas in the preferred procedure of this invention one first prepares a polymeric block which is insoluble in the inert hydrocarbon medium utilized even at polymerization temperatures. A second distinction prepared by the present invention resides in the fact that no crystalline polymers are disclosed by Belgian Patent No. 553,720; the products disclosed therein are described as being rubbery or liquid materials which are predominately soluble in hydrocarbons. Indeed, a primary object of the foregoing patent is the preparation of an elastomer; for this reason it is indicated that it is necessary that at least one of the monomers be a diene or possess functional substitution in order that the ultimate product can be vulcanized. In contrast to this, the block polymers of the present invention are solid, substantially crystalline products which are predominately insoluble in the inert hydrocarbon reaction media disclosed. Finally, Belgian Pat. No. 553,720 is distinguished from the processes and products of the present invention in that it fails to disclose block polymers and polymerization processes therefor wherein each of the monomers used in preparing such products contain only a single double bond per molecule and which contain no functional substitution, i.e., chloride, bromide, etc.

In an embodiment of this invention, the linear block polymers of this invention are prepared by first polymerizing an alpha-olefin having 2 to 8 carbon atoms per molecule utilizing as the catalyst a dispersion, in an inert liquid hydrocarbon medium, of a metal subhalide of a Group IVa, Va, or VIa metal in combination with a polymerization activator to form a solid, substantially crystalline homo-polymer block which is predominately insoluble in said reaction medium at the temperature at which polymerization is performed. Then the catalyst system containing the polymer block already formed is contacted, under polymerizing conditions with different alpha-olefin containing 2 to 8 carbon atoms, or a mixture of two or more of the same, in the presence of the unpolymerized portion of the first alpha-olefin monomer to produce an interpolymer block attached to the homopolymer block as an integral part of the ultimate linear block polymer chain.

In another embodiment of this invention there is described a method of producing an ethylene-modified polypropylene product containing as an essential component thereof molecules in which a portion of irregular ethylene-propylene copolymer is attached to one end of an isotactic polypropylene polymer chain, the total amount of ethylene units in said product being in the range from 1 to 20% by weight and the proportion of ethylene units in said ethylene-propylene copolymer being between 20 and 90% by weight, which comprises first homopolymerizing propylene by contact with a highly stereospecific Ziegler type olefin polymerization catalyst consisting essentially of a two-component system comprising a compound selected from the group consisting of the left hand subgroups of Groups 4, 5, 6 and of Group 8 of the Mendeleev Periodic Table and a cocatalyst selected from organometallic compounds of metals from Groups 1, 2 and 3 of the Periodic Table, until the concentration of solid polymer particles in the reaction slurry is at least about 80% of the desired final concentration, thereafter continuing polymerization in the presence of a mixture of propylene with ethylene wherein the concentration of propylene is in excess of ethylene, stopping the polymerization reaction when the amount of polymer has reached the desired final concentration and recovering said ethylene-modified polypropylene product.

In still another embodiment there is described a continuous process for producing an ethylene-modified polypropylene product in which the major proportion of ethylene is associated with polypropylene in such manner that it is not extractable in boiling cyclohexane in 24 hours, said product containing as an essential component thereof molecules in which a portion of irregular ethylene-propylene copolymer is attached to one end of an isotactic polypropylene polymer chain, the total amount of ethylene units in said product being in the range from 1 to 20% by weight and the proportion of ethylene units in said ethylene-propylene copolymer being between 20 and 90% by weight, which process comprises the steps of (1) continuously charging to a homopolymerization zone propylene and a paraffinic hydrocarbon diluent;

(2) maintaining in said homopolymerization zone an active concentration of a highly stereospecific Ziegler type olefin polymerization catalyst consisting essentially of titanium trichloride and an aluminum alkyl compound;

(3) conducting propylene polymerization in said homopolymerization zone to maintain the polypropylene concentration in the reaction slurry at least about 80% of the desired final polymer concentration;

(4) continuously passing part of the reaction slurry to a copolymerization zone;

(5) continuing polymerization in said copolymerization zone in the presence of a mixture of ethylene and propylene in predetermined fixed molar ratio in the range from 0.01:1 to 1:1 to produce a polymer slurry having said desired final concentration of polymer;

(6) continuously withdrawing reaction slurry from said copolymerization zone;

(7) deactivating catalyst in said slurry and removing catalyst residue therefrom; and (8) recovering said ethylene-modified polypropylene product.

A wide range of linear block polymers can be made in this manner and predetermined combinations of desirable properties for particular applications can be secured. This embodiment is preferred in that improved impact and low temperature properties are obtained. In a preferred embodiment the block polymers contain a much smaller amount of the second monomer, or mixture of monomers. Moreover, the block polymers of the preferred embodiment retain these improved properties as the molecular weight thereof decreases, i.e., block polymers having higher Melt Indices.

For convenience, the present invention is hereinafter largely described in terms of using titanium trichloride as the catalyst, and aluminum triethyl or diethyl aluminum chloride as the activator therefor, iso-octane or n-hexane as the inert, liquid reaction medium, and propylene and ethylene as the alpha-olefins which can be employed. The process of the invention, however, is not limited to such specific materials. Other specific catalyst systems, monomers and process conditions necessary for the preparation of the block polymers of this invention are illustrated by pages 350 through 367 of "Linear and Stereoregular Addition Polymers" by Norman G. Gaylord and Herman F. Mark, Interscience Publishers, 1959, as well as the following U.S. Pat. Nos. 3,099,647; 3,268,624; 3,296,338; 3,303,179; 3,328,375 and 3,362,916, the contents of which are incorporated herein by reference.

While a preferred procedure has been set forth herein with specific reference to the polymerization of propylene followed by a different alpha-olefin, such ethylene, the invention also embraces the preparation of block polymers from propylene followed by butene-1, 4-methyl-pentene-1, octene-1 and the like as well as the reverse order of any of said monomers or mixtures of the same. It is directed, moreover, to the preparation of block polymers from any two different alpha-olefins of 2 to 8 carbon atoms reacted in either order, provided that the alpha-olefins selected do not have a side chain substituent connected to the beta carbon atom. The combination of properties obtained in the product will depend upon the particular olefins selected, the order of reacting them, the proportions thereof incorporated in the block polymer product, and the reaction conditions chosen. The polymer products obtained accordingly can be tailor made for a variety of applications requiring different physical characteristics.

Thus, this invention preferably provides block polymers consisting essentially of a block of a homopolymer of one alpha-olefin terminally bonded to a second block of an interpolymer of two or more alpha-olefins, e.g., a polymer having the formula:

$$C_3H_7(C_3H_6)_k(C_2H_4-C_3H_6)_m(C_2H_4)_nC_2H_5 \qquad (I)$$

wherein k, m and n are whole numbers.

The polymeric product illustrated by (I) is generally produced according to this invention by each of two methods. In one illustrative embodiment, (A), propylene is polymerized first to produce a predominately insoluble homopolymer block; the reactor is then vented to a lower pressure and purged with nitrogen to remove as much of the unreacted propylene as is practicable. Ethylene is then introduced to complete the reaction, resulting in a predominately insoluble block polymer (I) wherein n is a larger whole number than m.

In a second embodiment, (B), propylene is polymerized to produce a predominately insoluble homopolymer block, then with little or no venting or purging, ethylene is introduced to produce a predominately insoluble block polymer (I) wherein m is a larger whole number than n; indeed n may approach or equal zero. In a modification of (B), a mixture of ethylene and propylene is polymerized to produce a copolymer block which may, or may not, be soluble in the reaction medium at polymerization temperature; the reactor is vented and purged to remove unreacted ethylene, if any, and more propylene is introduced to produce a homo-polymer block resulting in a block polymer (I) wherein m is a larger whole number than n, in fact wherein n usually approaches zero, which block polymer is predominately insoluble in the reaction medium at polymerization temperature. This latter product embodiment wherein n approaches or equals O may also be achieved by first polymerizing propylene to provide a home-polymer block, following which a mixture of propylene and ethylene are polymerized to provide a copolymer block. Examples of other alpha-olefins, i.e., olefins which can be used in the present invention to produce block polymer (I) are butene-1, e-methylbutene-1,3,3-dimethylbutene-1,4-methylpentene-1,3,4-dimethylhexane-1, allyl-benzene, styrene, and the like.

Since ethylene is not soluble in large quantities in the hydrocarbon reaction media, a polymer consisting essentially of homo-polymer blocks (m equals or approaches zero) may be prepared with some facility (as set forth in Application Ser. No. 424,819, supra.) by polymerizing ethylene first at elevated pressure to produce the predominately insoluble polymer block described herein, followed by venting to a lower pressure and polymerizing a second alpha-olefin to produce a predominately insoluble polymer consisting essentially of two homo-polymer blocks. On the other hand, since propylene is so much more soluble in the hydrocarbon reaction media, some of it remains therein after venting and purging, resulting in the production of product (I) which consists of a polymer made of a polymer made up of a homo-polymer block of propylene terminally connected to a copolymer block of ethylene and propylene; i.e. m is a whole number and wherein n approaches or equals O.

In general, the products of this invention contain between 0.2 and 60 weight percent of ethylene and correspondingly between 99.8 and 40 weight percent of propylene. When proceeding in accordance with embodiment (II-A), the ethylene: propylene weight proportion is generally in the range of from 3:97 to 50:50, preferably 10:90 to 35:65. When embodiment (II-B) is followed, the weight proportion of ethylene:propylene in the product is generally in the range of from 0.2:99.8 to 20:80, preferably from about 0.2:99.8 to 8:92. As increased ethylene contents frequently result in increased quantities of hydrocarbon-soluble amorphous materials, it is more preferable that the ethylene content not substantially exceed 5 weight percent. Polymers prepared in this manner have excellent characteristics, including low brittle points and high impact and tensile strengths.

In general, the amount of ethylene found in the copolymer block portion of the block polymers of this invention, varies over a wide range, i.e., between about 5% by weight and as high as 90% by weight. Usually, the ethylene content of the copolymer block portion of the block polymers of this invention is in the range between 5 and 35% by weight, and preferably it is between 10 and 20% by weight.

Block polymers prepared by the present process are distinctly different from copolymers made from the same monomers, i.e., polymers produced by reacting a pair of monomers in admixture with each other. For example, random copolymers of ethylene and propylene are generally amorphous rubbery materials which are largely soluble in boiling heptane, while the block polymers of propylene and ethylene made as herein described are solid highly crystalline materials which are mainly insoluble in boiling heptane. The present polymers also differ substantially from block type polymers made by polymerizing each monomer successively but alternating the monomer reactions a plurality of times so that the polymer molecule is made up of a number of alternate sections instead of only two sections as in the present case (product I as illustrated shows as many as three blocks; only the first two are significant, the third if present at all occurs as an impurity). When the polymer contains multiple alternate sections, the product tends to have lower crystallinity and less strength, and desirable properties of the present polymers are not obtained. Moreover, the block polymers of this invention are distinct from physical mixtures of their polymeric components.

The preferred catalyst system for use in the present process is a dispersion, in an inert organic liquid reaction medium, of particles of $TiCl_3$ in combination with an aluminum alkyl activator; as shown in the aforesaid patents, the presence of additional catalyst components is highly advantageous. The reaction medium preferably is an inert hydrocarbon or mixture of hydrocarbons, for example, hexanes, heptanes, octanes, cyclopentanes, cyclohexanes, benzene, toluene, xylenes, decalin and the like. Nonterminal olefins which will not react under the conditions employed during the reaction can also be used. The aluminum alkyl activator can be any aluminum alkyl wherein the alkyl groups each have 1-10 carbon atoms, e.g., diethyl aluminum monochloride trialkyis such as triethyl, trimethyl, triisobutyl, triisoctyl, and tridecyl compounds of aluminum, as well as the corresponding dialkyl halides thereof, can be used with good results. The amount of $TiCl_3$ that should be employed generally should be in the range of about 0.01 to 20 g. per liter of the inert liquid reaction medium, preferably 0.05 to 1.0 g. per liter. The molar ratio of the aluminum activator to $TiCl_3$ compound generally should be in the range of 0.2 to 10 and more preferably 0.5 to 2.5.

Temperatures at which the polymerization reactions are carried out in the present process generally are in the range of 30°-250° F. and more preferably 70°-180° F. The temperature level selected for each polymerization stage is a factor that influences the properties of the products obtained. The same or different temperatures can be employed in the two reaction stages and variations in product properties thereby can be obtained. With a monomer which is readily polymerizable such as ethylene, a relatively low reaction temperature can be employed, e.g., as low as 30° F.; whereas with a less easily polymerizable monomer, such as propylene, it is desirable to use a higher temperature, e.g. 120°-175° F., in order to secure a reasonable reaction rate. The pressure in the reactor will dpend upon the particular monomer, or mixtures of monomers, being polymerized and the reaction temperature selected. It may generally vary from atmospheric pressure to 500 psig or higher, practical considerations dictating a pressure in the range from about 75 to 180 psig.

A variety of techniques may be used for controlling the reaction, and thereby controlling the properties of the products thereby formed according to this invention. The techniques described in Application Ser. No. 439,,896, filed Mar. 15, 1965, are of particular interest. In addition, the less precise technique, which is sometimes used, is to control the relative contents and distributions, of the different monomers in the ultimate product by properly timing the introduction of the second monomer, or mixture of monomers. One may thus calculate, based on known rates of reactivity of catalysts and monomers, the point at which the second monomer, or mixture of monomers, should be introduced. As the reaction times involved are relatively short ones, reaction times are essentially directly proportional to polymer solids content in the reaction slurry after a given period of polymerization. Therefore, this criterion can be stated either in terms of time or slurry concentration. Thus, where total reaction time for making a block polymer according to this invention is two hours, approximately 80% of the solid product will be been produced after polymerization has been conducted for 96 minutes. In general, the period of time during which the homo-polymer block is prepared constitutes between 55 and 95% of the total polymerization period, and accordingly, in that period of time between 55 and 95% of the total solids are likewise produced. Generally, it is desirable to produce in excess of 75% of the total solids during the homo-polymerization phase of the process described herein; a practical limitation is 80% or more.

When preparing the copolymer block, one uses at least as much of the least reactive alpha-olefin, or more of the same, as one uses of the more reactive monomers. It is well known, for example, that ethylene is between about 15 and 25 times as reactive as is propylene when each of the two are polymerized in the presence of the stereospecific catalyst systems described herein. Accordingly, in any event, it is necessary that the reactor contain no more ethylene than propylene in the second phase of the process of this invention. Indeed, as the preferred polymers of this invention contain more propylene in the copolymer block than they do ethylene, it is necessary that the reactor in the second phase of this reaction contain considerably more propylene than ethylene. Thus, the mol ratio of propylene to ethylene in the second phase of the polymerization, may be any where between 1:1 and 100:1 or higher.

In a further embodiment of the invention which can be utilized when it is desired to secure an increase in the melt index of the polymer product, one or both of the polymerization stages is carried out in the presence of added hydrogen. For examples, ethylene is polymerized in the absence of hydrogen and thereafter propylene is polymerized with hydrogen being present in the reactor. The amount of hydrogen that should be added generally should be sufficient to produce a polymer having a melt index of between 0.1 and 10, preferably between 0.3 and 5.0, ideally between 0.5 and 4. Usually quantities of hydrogen in the range of about 5 to 100 ppm, preferably 10 to 50 ppm, based on the weight of solvent are used. The presence of the hydrogen causes the product to have a higher melt index so that it can be molded or cast more readily. This is secured, however, at the expense of certain other properties, particularly the impact strength and percent elongation at break which are considerably lowered. However, for applications where these properties are not particularly important while a higher melt index is desirable, practice of the invention with the use of hydrogen during one or both of the polymerization stages is advantageous.

It has been unexpectedly found, however, that when propylene is polymerized first in the presence of hydrogen, followed by polymerizing of ethylene in the substantial absence of hydrogen, higher melt indices are obtained without lowering either the impact strength or the elongation at break. Moreover, it is possible to obtain higher yield tensile strengths when proceeding according to this latter mode of operation than when the former mode of operation is used. Furthermore, the latter method provides another unexpected advantage in that more efficient heat transfer is obtained. Thus, when one polymerizes ethylene followed by propylene, a tenacious coating of polyethylene forms on the walls of the reactor which prevents efficient heat transfer from the contents of the reactor to the cooling medium, usually water, in the jacket surrounding the reactor, causing localized hot spots which result in the formation of a more heterogenous product. These results do not obtain when propylene is polymerized first in the manner described above.

The examples given below will serve to illustrate the invention more specifically. Test values given in the examples and also such values mentioned hereinafter in some of the claims are obtained by the following methods: brittle point—A.S.T.M. Method D-746-57T; Izod impact strength—A.S.T.M. Method D-256-56; yield strength, break strength and elongation at break—A.S.T.M. Method D-638-58T using rate of one inch per minute. Heat distortion values are determined by a modification of A.S.T.M. Method D-648-56 using a specimen having a thickness of 0.120–0.140 inch and a width of about 0.500 inch. Melt index values are determined by a modification of A.S.T.M. Method D-1238-57T using a temperature of 230° C. and a load of 2160 g. These test values are from compression moldings except where otherwise specified. With the exception of percent elongation, all percents are by weight.

EXAMPLE I

To a 2 gallon stainless steel jacketed stirred reactor are added 5,480 cc of hexane, 9.2 cc of a hexane solution containing 17% by volume of aluminum diethyl chloride, 25 ppm hydrogen, and 2,100 cc of propylene. Upon addition of 0.96 g of titanium trichloride in 2.88 g. of mineral oil, polymerization begins, the temperature rising to 160° F. at which point it is maintained throughout the reaction by a circulation of cooling water in the jacket. Propylene is continuously added to the reactor throughout the reaction in order to maintain the pressure at about 162 psig. During the reaction, an additional 1,060 cc of propylene is added to the reactor. After 43 minutes, 600 cc of this amount propylene had been added to the reactor. At that point, introduction of propylene were stopped. After 20 minutes more the pressure had dropped 10 psi. At this point 162 lbs. of propylene were added in order to bring the pressure up to 162 psig, following which the remainder of the additional propylene was added to maintain that pressure. After 88 minutes, all of the propylene has been added to the reactor, and the polymerization reaction is continued for 4 minutes more at which point the pressure dropped 2 psi, whereupon ethylene was introduced into the reactor and the polymerization continues. Sufficient ethylene is continuously added throughout this stage of the polymerization to bring the pressure and maintain it at 162 psig. After 10 minutes more, introduction of ethylene was stopped. Five minutes thereafter, the pressure had dropped to 152 psig, whereupon sufficient ethylene was added to bring the pressure to 160 psig. Ethylene introduction was continued for 5 minutes more, maintaining pressure at 160, whereupon (after 12 minutes total reaction time) ethylene feed was discontinued, a total of 58 g. of ethylene having been fed to the reactor. After 114 minutes (2 minutes more), methanol was added to deactivate the catalyst. Thereafter, the reaction mixture was filtered, and the solid polymer was repulped with methanol, and again separated by filtration. The resulting wet cake was extracted with pentane to remove methanol and pentane-soluble polymers and was then dried. The amount of pentane-soluble polymer was determined by evaporating the solvent from the filtrate. The amount of heptane-insoluble polymer in the pentane-insoluble product also was determined by dissolving the same in boiling n-heptane.

EXAMPLE II

The polymerization reaction of Example I is repeated with the following modifications:
(a) initial quantity of propylene added is 2120 cc. giving a pressure of 160 psig;
(b) propylene is initially shut off after 30 minutes and is resumed after 45 minutes, the pressure having dropped 10 psi in those 15 minutes;
(c) after 60 minutes, 1060 cc. of propylene have been added and such addition is stopped;
(d) the polymerization reaction is continued until the pressure drops 5 psi at 64 minutes, at which point the reactor is vented until the pressure drops an additional 35 psi at 22 minutes;
(e) additional propylene is introduced to increase the pressure by 40 psi (160 psig.), requiring about 600 cc.;
(f) propylene polymerization is then continued until the pressure drops 3 psi at 76 minutes, whereupon ethylene is introduced and polymerized causing the pressure to increase to 75 psig, a total of 48 grams of ethylene having been added at 83 minutes;
(g) after all of the ethylene has been introduced, the polymerization of ethylene is continued for an additional 30 minutes (pressure has decreased to 127 psig.), at which point the catalyst is deactivated and the polymer recovered in the same manner as described in Example I.

EXAMPLE III

The procedure of Example I is repeated with the following modifications:
(a) 18 ppm of $H_2$ are used;
(b) 2120 cc. of propylene are initially added to reactor to give pressure of 170 psig.;
(c) propylene is initially shut off after 38 minutes and resumed after 10 psi pressure drop at 52 minutes;
(d) final shut-off of propylene takes place at 74 minutes;
(e) at 78 minutes start adding ethylene, 52 g. having been added at 94 minutes;
(f) polymerization continued with no further ethylene addition until 114 minutes, at which point pressure has dropped to 133 psig.

EXAMPLE IV

The procedure of Example II is repeated with the following modifications:
(a) propylene initially shut off at 30 minutes and resumed at 41 minutes;
(b) after 59 minutes, 1060 cc. of propylene have been added and such addition is stopped;
(c) after continued polymerization causes pressure drop of 5 psi at 65 minutes, reactor is vented to cause pressure drop of additional 25 psi at 70 minutes;
(d) after adding propylene to resume operating pressure, polymerization continues until pressure drops 2 psi at 74 minutes;
(e) start ethylene addition at 74 minutes, completing same at 90 minutes having added 52 g. thereof;
(f) polymerization thereafter continued 20 minutes stopping at 110 minutes total, pressure then being 125 psig.

The physical properties for the polymers prepared according to each of Examples I, II, III, and IV are tabulated in Table I.

TABLE I

| | Total Product | | Pentane Insoluble Polymer | | | |
|---|---|---|---|---|---|---|
| Example | Wt. % Slurry Solids After Propylene Polymeriz. | % Ethylene* | % Pentane Soluble | % Heptane Insoluble | Melt Index | Izod Impact (ft-lb./in.) |
| I | 81 | 0.2 | 28.8 | 92.1 | 0.36 | 15.6 |
| II | 74 | 3.0 | 28.5 | 93.2 | 0.20 | 14.6 |
| III | 69 | 6.0 | 32.0 | 93.9 | 0.28 | 13.2 |
| IV | 68 | 5.0 | 34.1 | 90.8 | 0.27 | 11.9 |

*Calculated by determining difference between weight of ethylene charged to the reactor and that remaining therein at termination of the reaction.

EXAMPLE V

The procedure of Example I is repeated with the following modifications:
(a) 22 ppm of $H_2$ are used;
(b) operating pressure is 165 psig.;
(c) initial shut-off of propylene is at 32 minutes, resumed at 48 minutes;
(d) final shut-off of propylene is 63 minutes;
(e) ethylene feed started at 68 minutes;
(f) ethylene shut off at 82 minutes, 52 g. thereof having been added;
(g) polymerization ended at 85 minutes, pressure then at 159 psig;

EXAMPLE VI

Example I is repeated with the following modifications:
(a) operating pressure is 163 psig.;
(b) initial propylene shut-off at 30 minutes, resumed at 42 minutes;
(c) final propylene shut-off at 58 minutes;
(d) ethylene feed started 60 minutes;
(e) ethylene shut-off at 68 minutes, 52 g. thereof having been added;
(f) polymerization stopped at 88 minutes, pressure then at 124 psig.

EXAMPLE VII

The proecdure of Example II is repeated with the following modifications:
(a) 30 ppm of $H_2$ used;
(b) propylene operating pressure is 170 psig.;
(c) initial propylene shut-off at 35 minutes, resumed at 54 minutes;
(d) the 1060 cc. additional quantity of propylene had been added at 79 minutes at which point propylene was shut off;

(e) at 89 minutes polymerization had caused pressure drop of 5 psi whereupon reactor vented to cause pressure drop of additional 35 psi at 97 minutes;
(f) reactor repressured to operating pressure with propylene at 99 minutes and propylene addition stopped;
(g) at 104 minutes polymerization resulted in pressure drop to 168 psig. whereupon ethylene was continuously fed to the reactor to maintain that pressure;
(h) at 130 minutes ethylene addition was stopped, 51 g. having been added;
(i) at 150 minutes polymerization was stopped, the pressure then being 140 psig.

EXAMPLE VIII

The procedure of Example V is repeated with the following modification:
(a) average propylene operating pressure was 175 psig.;
(b) initial propylene shut-off at 43 minutes, resumed at 61 minutes;
(c) propylene shut-off at 112 minutes;
(d) continued polymerization caused 2 psi pressure drop at 117 minutes, whereupon ethylene fed to reactor;
(e) at 138 minutes ethylene shut off;
(f) polymerization stopped at 143 minutes, pressure then being 167 psig.

EXAMPLE IX

The procedure of Example VIII is repeated with the following modifications:
(a) propylene operating pressure is 173 psig.;
(b) initial propylene shut-off at 37 minutes; resumed at 54 minutes;
(c) propylene shut-off at 81 minutes;
(d) at 84 minutes, ethylene fed to reactor, maintaining pressure of 171 psig.;
(e) ethylene stopped 103 minutes, 51 g. thereof having been added by then;
(f) polymerization was stopped at 108 minutes, pressure then being 159 psig.

TABLE II

| | Total Product | | Pentane Insoluble Polymer | | | |
|---|---|---|---|---|---|---|
| Example | Wt. % Slurry Solids After Propylene Polymeriz. | % Ethylene* | % Pentane Soluble | % Heptane Insoluble | Melt Index | Izod Impact (ft-lb./in.) |
| V | 80 | 0.2 | 28.0 | 92.8 | 0.97 | 14.3 |
| VI | 68 | 3.0 | 26.2 | 92.3 | 0.81 | 8.6 |
| VII | 69 | 4.0 | 25.2 | 93.5 | 0.52 | 8.0 |
| VIII | 81 | 4.0 | 15.1 | 95.3 | 0.99 | 3.9 |
| IX | 77 | 3.0 | 23.4 | 93.0 | 1.56 | 7.0 |

*Calculated by determining difference between weight of ethylene charged to the reactor and that remaining therein at termination of the reaction.

EXAMPLE X

Three hundred and seventy-five grams of the product prepared in Example I, 425 grams of the product prepared in Example II, 383 grams of the product prepared in Example III, and 534 grams of the product prepared in Example IV were combined in a Waring blender, the various test data for the composite being tabulated in Table III.

EXAMPLE XI

Three hundred and seventy-nine grams of the product prepared in Example V, 392 grams of the product prepared in Example VI, 282 grams of the product prepared in Example VII, 543 grams of the product prepared in Example VIII, and 220 grams of the product prepared in Example IX were combined in a Waring blender and various test data of this composite were determined.

The test data appearing in Table III were obtained from injection moldings of the composite products of each of Example X and XI.

CONTROL

Sixty-five parts of polypropylene powder having a melt index of 3.3 were blended with 35 parts polyethylene powder having a molecular weight of 1,700,000 to produce an intimate mixture thereof. When injection moldings thereof are compared with the block polymers of Examples X and XI, significant advantages are shown for the polymers of this invention as shown in Table III. Whereas, the polymers of Examples X and XI each contain about 1% ethylene, 35% polyethylene must be blended with polypropylene (this Control) to achieve a brittle point similar to those of said examples. In addition, the percent elongation of the blend of the Control is drastically lower than those of the polymers of this invention; of. Examples X, and XI with the Control. Moreover, the Izod impacts of the block polymers cf Examples X and XI are at least 300% of that of the blend of the Control.

TABLE III

| Pentane Insoluble Polymer | Example X | Example XI | Control |
|---|---|---|---|
| Melt Index | 0.4 | 0.7 | 0.5 |
| Yield Strength | 3930 psi | 3930 psi | 4660 psi |
| % Elongation | >622* | >622 | 70 |
| Brittle Point | 13° F. | 14.9° F. | 13° F. |
| Izod Impact (ft. lb./in.) | 16.6 | 15.7 | 5.1 |
| Ethylene content** | ~1% | ~1% | 35% |
| Modulus | 120,400 | 109,400 | 148,100 |

*Limit of the apparatus
**Method II "Preprints of Papers of the Division of Polymer Chemistry", April 1960, Vol. 1, No. 1, pages 325 to 330, by P. E. Wei.

EXAMPLE XII

Example I was repeated with the following modifications:
(a) 2560 cc. of hexane were used;
(b) 47 ppm of $H_2$ were used;
(c) reactor brought to operating pressure (162 psig.) by adding 995 cc. of propylene.
(d) additional propylene added to maintain pressure until at 250 minutes addition thereof was stopped (675 cc. additional having then been added):

(e) pressure dropped to 152 psig. by 299 minutes;
(f) propylene addition resumed at 299 minutes to repressure to 162 psig.;
(g) propylene stopped at 300 minutes, 105 cc. more having been added in order to reach operating pressure;
(h) propylene polymerization continued until 327 minutes at which point pressure was 157 psig.;
(i) at 327 minutes ethylene addition started reaching 160 psig. at 345 minutes, and continued until 390 minutes at which point 100 g. thereof had been added;
(j) polymerization stopped at 425 minutes, pressure then being 107 psig. Solid, dry pentane-insoluble product weighed 396 g.

The ethylene sequence distribution and the total ethylene content of terminal block copolymers of Examples III, IV, VII, VIII, IX and XII were determined by an infrared techinque developed initially by Bucci and Simonazzi (J. Polymer Sci., C 7, 203–212). These determinations are reported in Table IV under the heading: "Total $C_2^=$". By combination of the ethylene sequence distribution analysis from above and the theoretical sequence distribution as reported by Natta et al. (Chim. e. Ind. 42, 125–32, 1960), the ethylene content in the ethylene-propylene copolymer block portion of the aforesaid terminal block copolymers was calculated. These calculated values are reported in Table IV under the heading: "Wt. % Ethylene in Copolymer Block".

TABLE IV

| | Wt. % Ethylene in Total Sample | | | Wt. % Ethylene |
|---|---|---|---|---|
| Example | $(C_2^=)_1$ | $(C_2^=)_1$ | Total $C_2^=$ | In Copolymer Blocks |
| III | 1.53 | 0.62 | 2.15 | 21.4 |
| IV | 1.63 | 0.77 | 2.40 | 24.0 |
| VII | 1.54 | 0.38 | 1.92 | 14.0 |
| VIII | 1.17 | 0.63 | 1.80 | 26.2 |
| IX | 1.43* | 1.39* | 2.82* | 39.0 |
| XII | 1.7 | 3.5 | 5.2 | 57.0 |

*Average of two sets of analyses and calculations

From the foregoing examples it is apparent that the present invention provides block polymers having a wide range of properties suitable for various uses. It is especially useful in providing block polymers having the following desirable combination of properties: brittle point generally below 40° F., preferably below 30° F.; Izod impact strength of at least 3.5 ft. lbs./in., usually at least 6 ft. lbs./in. and preferably 12 ft. lbs./in. or higher; and tensile yield strength of at least 3,000 psi at 1 in./min. and preferably above 3,500 psi at 1 in./min. Other alpha-olefins having 2 to 8 carbon atoms per molecule and which do not contain a side chain substituent connected to the beta unsaturated carbon atom can be substituted for either the ethylene or propylene or both. However, it is generally preferable in practicing the invention to employ propylene as one of the two monomers and to react proylene first and thereafter react the other alpha-olefin or mixtures of two or more alpha-olefins.

Although the process of the invention has been described largely in terms of using titanium trichloride as the catalyst and aluminum triethyl as the activator, other metal subhalides and other activators can be employed. By "metal subhalide", and terms of similar import, is meant a metal halid in which the valence of the metal is less than its maximum value. The subhalides of the metals of Groups IVa, Va, and VIa of the Periodic Table according to Mendeleeff can be used as the solid catalyst; for example, a subhalide of zirconium, chromium, vandaium, molybdenum, or titanium can be used. Specific examples are vanadium trichloride, zirconium trichloride, chromium dichloride, molybedenum tetrachloride, and the bromide, iodide, and fluroide analogues thereof. Such metal subhalides can be prepared by any convenient means. For example, titanium trichloride can be prepared by reducing titanium tetrachloride as by means of an aluminum trialkyl agent, or by other reducing means such as by contacting the metal compound with a dispersion of an alkali metal in an inert solvent, or by contacting with hydrogen at an elevated temperature. It is necessary, however, that an activator, such as an aluminum trialkyl or aluminum alkyl halide, be present as a component of the catalyst system, and it is convenient in many instances to employ such a compound as both the reducing agent and activator. However, the use of a pre-reduced compound, such as $TiCl_3$, together with an activator, gives excellent results.

Materials which can be used as the activator, in addition to aluminum trialkyls, include other metal alkyls, metal hydrides, metal borohydrides, and alkyl metal halides. Suitable metal alkyls include alkyl derivatives of aluminum, zinc, beryllium, chromium, magnesium, lithium, and lead. Aluminum triethyl, aluminum triisopropyl, aluminum triisobutyl, and the magnesium and zinc analogues thereof give good results in the process, but metal alkyls having up to about 10 carbon atoms in the alkyl groups can be used. Alkali metal alkyls such as n-butyllithium, methylsodium, butylsodium, phenylisopropylpotassium, and the like, also illustrate metal alkyls that can be employed in the process. Metal hydrides which can be used as polymerization activators include, for example, lithium hydride, lithium aluminum hydride, and sodium hydride. Metal borohydrides such as sodium borohydride and potassium borohydride illustrate the borohydrides which can be employed. Alkyl metal halides which can be used are Grignard reagents such as methylmagnesium bromide, ethylmagnesium chloride, phenylmagnesium bromide, and the like. Catalysts combinations of $TiCl_3$ and alkyl aluminum halides, such as diethyl aluminum chloride, are preferred as they provide much higher yields of hydrocarbon-insoluble linear block polymers than other catalyst systems.

The quantities of these catalytic components can be varied considerably and good results are obtained. Generally, the mol ratio of metal compound to activator will be in the range of from 1:10 to 10:1 when the metal compound is prereduced or is reduced by the activator.

What is claimed is:

1. A method of producing an ethylene-modified polypropylene product containing as an essential component thereof molecules in which a portion of irregular ethylene-propylene copolymer is attached to one end of an isotactic polypropylene polymer chain, the total amount of ethylene units in said product being in the range from 1 to 20% by weight and the proportion of ethylene units in said ethylene-propylene copolmer being between 20 and 90% by weight, which comprises first homopolymerizing propylene by contact with a highly stereospecific Ziegler type olefin polymerization catalyst consisting of a reaction product of titanium trichloride and diethylaluminum chloride, until the concentration of solid polymer particles in the reaction slurry is at least about 80% of the desired final concentration, thereafter continuing polymerization in the presence of a mixture of propylene with ethylene wherein the concentration of propylene is in excess of ethylene, stopping the polymerization reaction when the amount of polymer has reached the desired final concentration, and recovering said ethylene-modified polypropylene product.

2. A process for producing a polymeric composition which comprises contacting, under polymerizing conditions, propylene with a catalyst system comprising a dispersion of solid particles of titanium trichloride and an activator therefor consisting of an alkylaluminum halide, in an inert hydrocarbon liquid reaction medium whereby said propylene is polmerized to produce a solid, substantially crystalline polymeric product which is predominantly insoluble in said reaction medium at the temperature of polmerization, then contacting a monomeric composition consisting essentially of propylene and at least one $C_4$–$C_8$ alpha-olefin with said catalyst system under polymerizing conditions whereby said monomeric composition polymerizes as an extension to the previously formed polymeric block, then terminating the polymerization and separating from the reaction mixture a solid, substantially crystalline product which is predominantly insoluble in said reaction medium at the polymerization temperature.

3. A process for producing a polymeric composition which comprises contacting, under polymerizing conditions, a $C_4$–$C_8$ alpha-olefin with a catalyst system comprising a dispersion of solid particles of titanium trichloride and an activator therefor selectd from the group consisting of (1) metal alkyls wherein the metal is aluminum, zinc, beryllium, magnesium, lead, or an alkali metal; (2) alkyl metal halides wherein the metal is aluminum or magnesium; (3) lithium hydride, soldium hydride, or lithium-aluminum hydride; and (4) sodium borohydride or potassium boro hydride, in an inert hydrocarbon liquid reaction medium whereby said alpha-olefin is polymerized to produce a solid, substantially crystalline product which is predominantly insoluble in said reaction medium at the temperature of polymerization, then contacting a monomeric composition consisting essentially of said first alpha-olefin and at least one other $C_2$–$C_8$ alpha-olefin with said catalyst system under polymerizing conditions whereby said monomeric composition polymerizes as an extension to the previously formed polymeric block, then terminating the polymerization and separating from the reaction mixture a solid, substantially crystalline product which is predominantly insoluble in said reaction medium at the polymerization temperature.

4. The process of claim 3 wherein the activator is an alkylaluminum halide.

5. The process of claim 3 wherein hydrogen is present during the polymerization of said first alpha-olefin.

* * * * *

UNITED STATES PATENT OFFICE
CERTIFICATE OF CORRECTION

Patent No. 4,301,256  Dated November 17, 1981

Inventor(s) JAMES L. JEZL

It is certified that error appears in the above-identified patent and that said Letters Patent are hereby corrected as shown below:

Title page, under "Related U.S. Application Data", line 3, omit "abandoned,"

Patent

| Col. | Line | |
|---|---|---|
| 2 | 16 | "prepared" should be --presented-- |
| 5 | 4 | "home-polymer" should be --homo-polymer-- |
| 5 | 10 | "dimethylhexane-1" should be --dimethylhexene-1-- |
| 6 | 25 | "trialkyis" should be --trialkyls-- |
| 6 | 25 | "triethyl." should be --triethyl,-- |
| 6 | 49 | "dpend" should be --depend-- |
| 6 | 59 | "439,,896" should be --439,896-- |
| 7 | 7 | "will be been" should be --will have been-- |
| 8 | 42 | "were stopped." should be --was stopped.-- |
| 9 | 39 | "75 psig" should be --175 psig-- |
| 10 | 60 | "proecdure" should be --procedure-- |
| 11 | 8 | "168 psig. whereupon" should be --168 psig., whereupon-- |
| 12 | 9 | "Example" should be --Examples-- |
| 12 | 25 | "of. Examples" should be --cf. Examples-- |
| 12 | 27 | "cf" should be --of-- |
| 12 | 68 | "added):" should be --added);-- |
| 13 | 24 | "42" should be --42-- |

UNITED STATES PATENT OFFICE
CERTIFICATE OF CORRECTION

Patent No. 4,301,256  Dated November 17, 1981

Inventor(s) JAMES L. JEZL

It is certified that error appears in the above-identified patent and that said Letters Patent are hereby corrected as shown below:

Patent

| Col. | Line | | |
|---|---|---|---|
| 13<br>Table IV | 32 | "$(C_2^=)_1$" (second occurrence) should be | --$(C_2^=)_1$-- |
| 13 | 63 | "halid" should be | --halide-- |
| 13 | 68 | "vandaium" should be | --vanadium-- |
| 14 | 2 | "molybedenum" should be | --molybdenum-- |
| 14 | 3 | "fluroide" should be | --fluoride-- |
| 14 | 59 | "copolmer" should be | --copolymer-- |
| 15 | 12 | "polmerized" should be | --polymerized-- |
| 16 | 2 | "selectd" should be | --selected-- |
| 16 | 8 | "boro hydride" should be | --borohydride-- |

Signed and Sealed this

Twentieth Day of December 1983

[SEAL]

Attest:

GERALD J. MOSSINGHOFF

Attesting Officer   Commissioner of Patents and Trademarks